US008175975B2

(12) United States Patent  
Cai et al.

(10) Patent No.: US 8,175,975 B2  
(45) Date of Patent: May 8, 2012

(54) IMS DEVICE OPERABLE FOR FINANCIAL TRANSACTION AUTHORIZATION AND ID CARDS DISPLAY

(75) Inventors: Yigang Cai, Naperville, IL (US); Shiyan Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/193,550

(22) Filed: Aug. 18, 2008

(65) Prior Publication Data

US 2010/0042525 A1 Feb. 18, 2010

(51) Int. Cl.  
 *G06Q 40/00* (2006.01)
(52) U.S. Cl. ............................................ 705/44; 705/30
(58) Field of Classification Search ............... 705/10–44  
See application file for complete search history.

(56) References Cited

U.S. PATENT DOCUMENTS

| | | | |
|---|---|---|---|
| 5,914,472 A * | 6/1999 | Foladare et al. | 235/380 |
| 6,047,270 A * | 4/2000 | Joao et al. | 705/44 |
| 6,714,797 B1 * | 3/2004 | Rautila | 455/552.1 |
| 7,552,333 B2 * | 6/2009 | Wheeler et al. | 713/176 |
| 7,558,965 B2 * | 7/2009 | Wheeler et al. | 713/186 |
| 7,765,481 B2 * | 7/2010 | Dixon et al. | 715/738 |
| 7,904,360 B2 * | 3/2011 | Evans | 705/35 |
| 2002/0169720 A1 * | 11/2002 | Wilson et al. | 705/44 |
| 2007/0244811 A1 * | 10/2007 | Tumminaro | 705/39 |
| 2008/0167961 A1 * | 7/2008 | Wentker et al. | 705/14 |
| 2008/0190473 A1 * | 8/2008 | Mettavant | 135/126 |
| 2009/0119190 A1 * | 5/2009 | Realini | 705/30 |

* cited by examiner

*Primary Examiner* — Frantzy Poinvil  
(74) *Attorney, Agent, or Firm* — Duft Bornsen & Fishman LLP

(57) ABSTRACT

IMS networks and methods are disclosed for authorizing financial transactions. Credit card information, debit card information, and other purchasing data may be consolidated into an IMS device for conducting financial transactions, such as the purchasing of items from a merchant. Before a financial transaction can be completed, an IMS device transmits transaction data for the financial transaction to the IMS network. The IMS network then processes predefined purchasing rules to determine whether or not the financial transaction is authorized. If the financial transaction is authorized, then the IMS network transmits a confirmation message to the IMS device indicating that the financial transaction is authorized. If the financial transaction is not authorized, then the IMS network transmits a cancel message to the IMS device indicating that the financial transaction is not authorized.

20 Claims, 6 Drawing Sheets

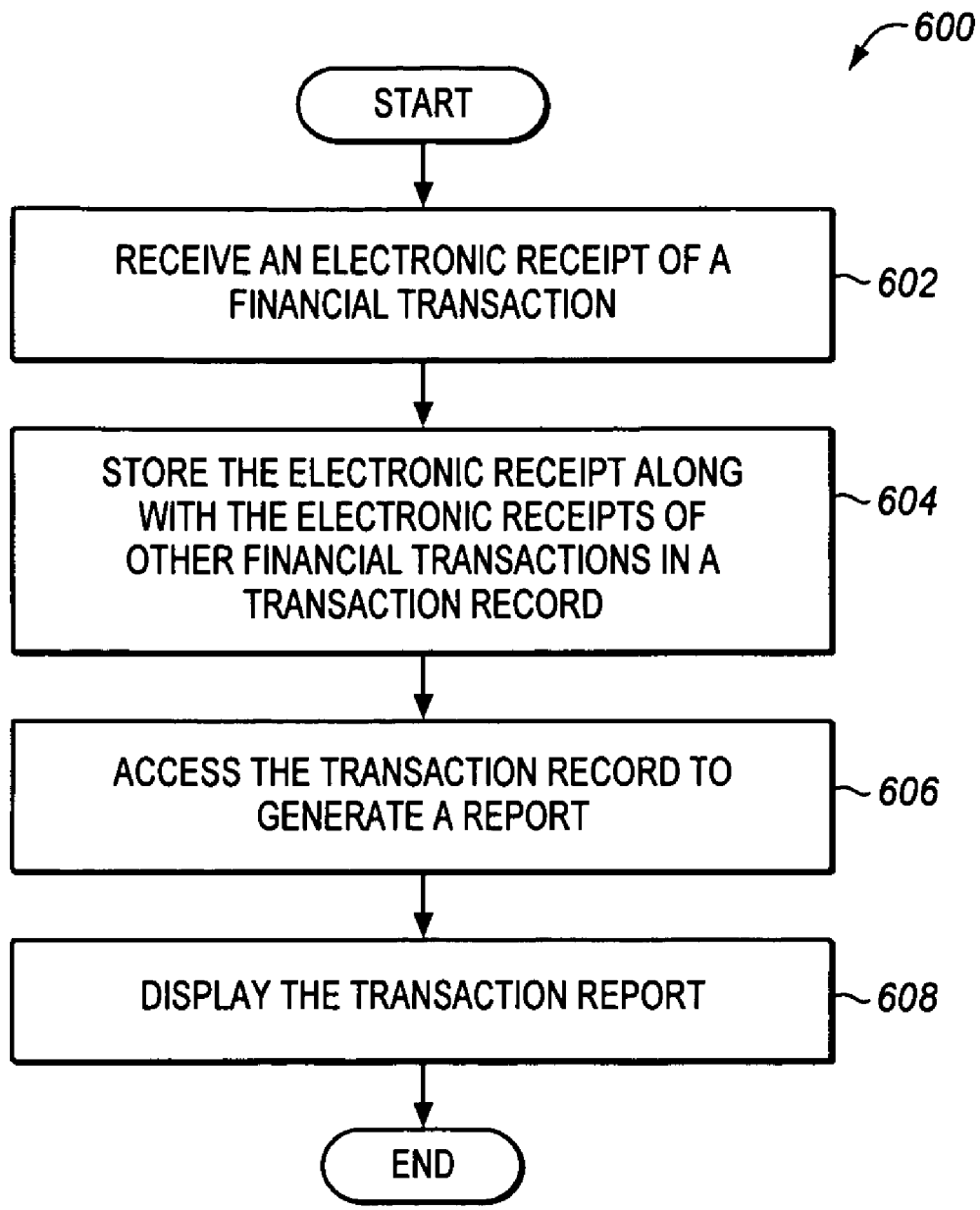

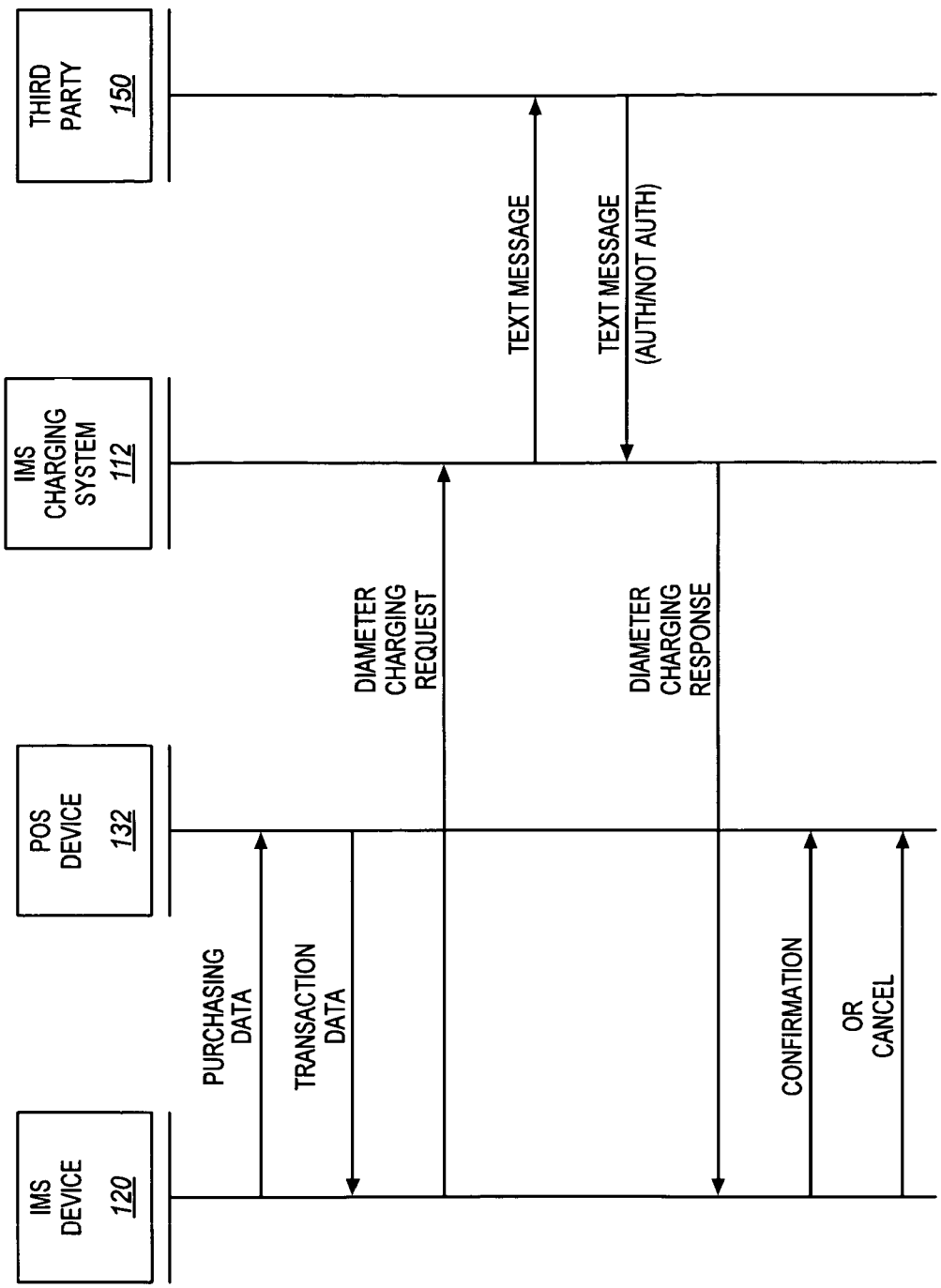

IMS DEVICE OPERABLE FOR FINANCIAL TRANSACTION AUTHORIZATION AND ID CARDS DISPLAY

BACKGROUND OF THE INVENTION

1. Field of the Invention

The invention is related to the field of communication networks and, in particular, to authorizing financial transaction, such as credit card purchases, through an IMS network and IMS devices.

2. Statement of the Problem

Credit cards and debit cards have become a popular alternative to cash and checks for making purchases. Thus, it is common for a person to carry multiple credit cards, a debit card, and an ATM card in a purse or a wallet. It is also common for a person to carry a driver's license, a medical insurance card, a frequent flyer card, and numerous other cards serving a variety of purposes. Due to the popularity of mobile communications, it is also common for a person to carry a cell phone, a PDA, a BlackBerry or some other mobile communication device.

A person in possession of a credit card, a debit card, etc, is able to purchase a variety of items without having to prove they are authorized to make the purchase. For example, items may be purchased over the internet by entering a credit card number, an expiration date, and a billing address. The website through which the purchase is made frequently accepts the transaction without verifying whether the purchaser is authorized to make the purchase. If a financial transaction is made in person, then a merchant may compare a purchaser's signature to the back of the credit card to verify that the signatures match. However, a verified signature may not correctly indicate that the purchaser is authorized to make the purchase. For example, assume that a parent gives a child a credit card to use "in emergencies". If the child subsequently purchases a video game with the credit card, then the merchant may correctly verify that the child indeed is the owner of the credit card, but the child is still not authorized to make the purchase where the parents are concerned.

It may be desirable to add a layer of protection on credit card transactions and other electronic purchasing transactions so that an authority figure, such as a parent or boss, can control whether or not purchases can be made.

SUMMARY OF THE SOLUTION

Embodiments of the invention provide ways of controlling financial transactions through an IMS network. Credit card information, debit card information, and other purchasing data may be consolidated into an IMS device for conducting financial transactions, such as the purchasing of items from a merchant. Before a financial transaction can be completed, an IMS device transmits transaction data for the financial transaction to the IMS network. The IMS network then processes predefined purchasing rules based on the transaction data to determine whether or not the financial transaction is authorized. If the financial transaction is authorized, then the IMS network transmits a confirmation message to the IMS device indicating that the financial transaction is authorized. If the financial transaction is not authorized, then the IMS network transmits a cancel message to the IMS device indicating that the financial transaction is not authorized. Through the purchasing rules defined in the IMS network, an authority figure, such as a parent or boss, can advantageously control which financial transactions are authorized through the credit card, the debit card, etc, that are consolidated on the IMS device.

One embodiment of the invention comprises an IMS device that operates to authorize financial transactions. The IMS device stores purchasing data in the form of credit card numbers, debit card numbers, bank card or bank account numbers, etc. When it is time to pay for an item being purchased from a merchant, the IMS device identifies purchasing data for purchasing the item. For instance, the user of the IMS device may select a credit card which is stored in the IMS device. The IMS device then provides the purchasing data to a point-of-sale device of the merchant for use in purchasing the item. For example, the IMS device may provide the purchasing data to the point-of-sale device using a Bluetooth connection or some other short range wireless connection. In response to the purchasing data, the IMS device receives transaction data for the financial transaction from the point-of-sale device, indicating the amount of the transaction, a merchant identifier, a product identifier, etc. The IMS device then transmits the transaction data to an IMS charging system (e.g., an Online Charging System (OCS) or Charging Collector Function (CCF)) in the IMS network requesting authorization for the financial transaction.

In another embodiment, the IMS charging system receives the transaction data from the IMS device, such as in a Diameter charging request. Responsive to receiving the transaction data, the IMS charging system identifies the purchasing rules that have been defined for the user of the IMS device. The IMS charging system processes the purchasing rules and the transaction data to determine whether the financial transaction is authorized. To determine whether the financial transaction is authorized, the IMS charging system may query a third party (i.e., a parent or boss), a financial institution, or some other individual or entity as to whether the transaction is authorized. The IMS charging system then transmits authorization data to the IMS device indicating whether or not the financial transaction is authorized based on the purchasing rules defined in the IMS network.

The IMS device receives the authorization data, and processes the authorization data to determine whether the financial transaction is authorized. If the financial transaction is authorized, then the IMS device transmits a confirmation message to the point-of-sale device of the merchant indicating that the financial transaction is authorized. The point-of-sale device may then complete the financial transaction. If the financial transaction is not authorized, then the IMS device transmits a cancel message to the point-of-sale device indicating that the financial transaction is not authorized, and the point-of-sale device does not complete the financial transaction.

The invention may include other exemplary embodiments described below.

DESCRIPTION OF THE DRAWINGS

The same reference number represents the same element or same type of element on all drawings.

FIG. 6 is a flowchart illustrating a method of storing records of financial transactions in an exemplary embodiment of the invention.

FIG. 7 is a message diagram illustrating authorization of a financial transaction in an exemplary embodiment of the invention.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
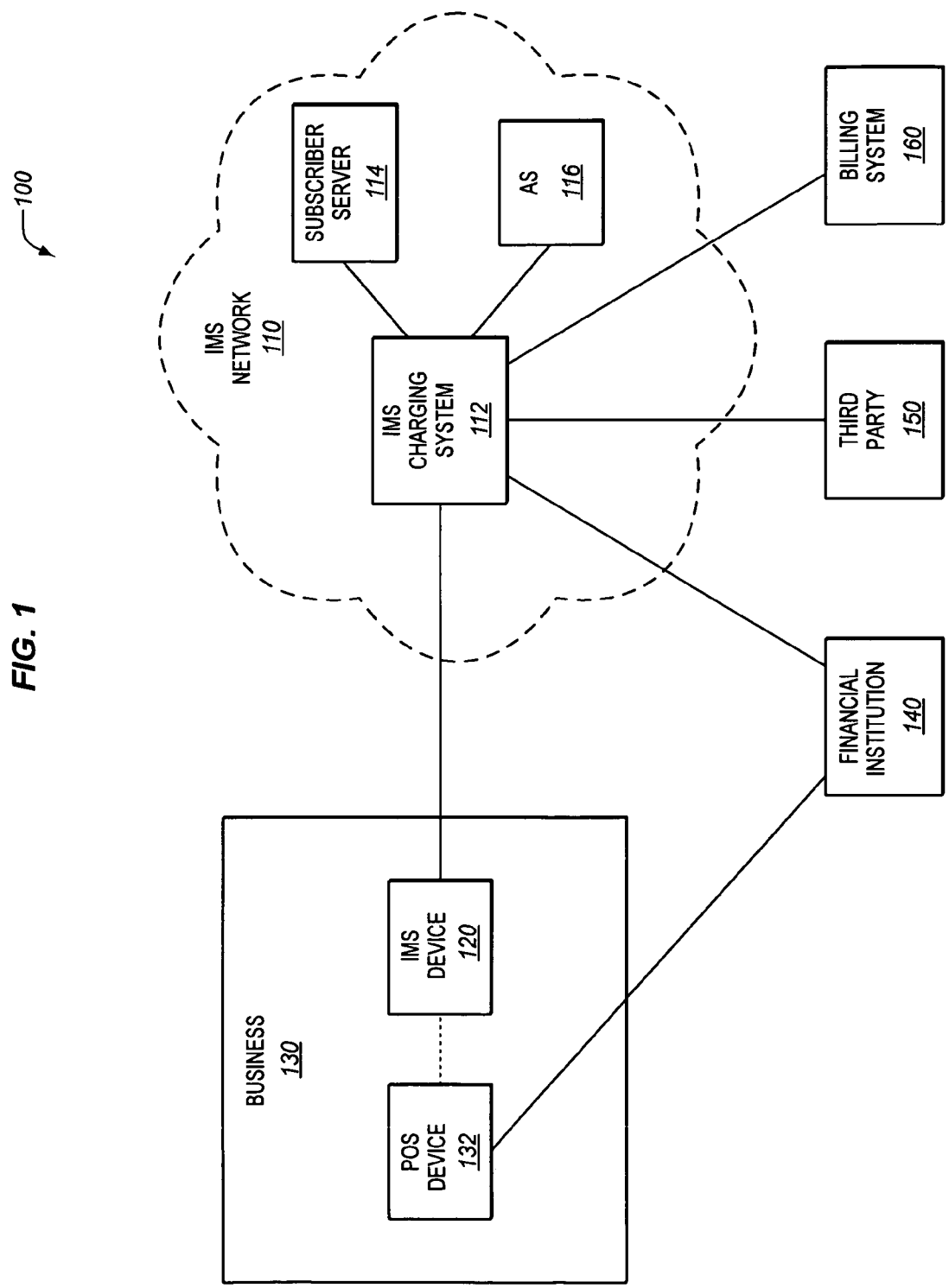
FIG. 1 illustrates a communication network in an exemplary embodiment of the invention.

FIG. 1 illustrates a communication network 100 in an exemplary embodiment of the invention. Communication network 100 includes an IMS network 110 operable to provide communication service to an IMS-compliant device 120. Those skilled in the art will appreciate that IMS device 120 may communicate with IMS network 110 through one of a variety of types of access networks. An access network comprises any wireless network operable to provide mobile or nomadic communications, such as a cellular network (e.g., a CDMA network or a UMTS network), or a Wireless Local Area Network (WLAN), such as a WiFi or WiMAX network.

IMS network 110 includes an IMS charging system 112, a subscriber server 114, and an application server (AS) 116. IMS charging system 112 comprises any system, server, or function operable to provide charging for sessions in IMS network 110. IMS charging system 112 may be operable to provide online charging, such as an Online Charging System (OCS). IMS charging system 112 may additionally or alternatively be operable to provide offline charging, such as a Charging Collector Function (CCF), a Charging Data Function (CDF), etc. Subscriber server 114 comprises any system, server, or function, such as a Home Subscriber Server (HSS), that is operable to store or maintain subscriber profiles for users of IMS network 110. Application server (AS) 116 comprises any system, server, or function operable to provide additional services to IMS devices. For example, application server 116 may provide a service that allows a user of IMS device 120 to consolidate credit card information, debit card information, and other purchasing data into IMS device 120. This type of service may be referred to as a Secure Super Wallet (SSW) service or a Secure Super Purse (SSP) service, as the card information typically stored in a wallet or a purse is consolidated on IMS device 120 or in IMS network 110. IMS network 110 may include other network elements that are not shown for the sake of brevity, such a Serving-CSCF (S-CSCF), a Proxy-CSCF (P-CSCF), etc.

According to the embodiments described herein, IMS network 110 is operable to authorize the purchase of items and other financial transactions made by the user of IMS device 120. As an example, IMS device 120 and its associated user are located in a business 130 of a merchant that sells products, services, etc, which are collectively referred to herein as "items". Items may be purchased from the merchant through point-of-sale (POS) device 132. A point-of-sale device 132 comprises any hardware, software, or firmware that controls financial transactions for receiving payment from a buyer. A common point-of-sale device 132 includes a scanner for bar codes or other product labels, a credit/debit card scanner for scanning credit/debit card information, or other systems for identifying items being purchased, identifying purchasing information (e.g., credit card number), and completing a financial transaction for the purchase of the items. Point-of-sale device 132 may also comprise a server for a website, or some other device on a network, such as the internet, that handles electronic financial transactions (e.g., shopping cart software). In cases where a credit card, debit card, bank card, etc, is used for the financial transaction, point-of-sale device 132 communicates with a financial institution 140 to authorize the transaction, and to report the results of the transaction, such as the amount of the transaction, the date/time of the transaction, etc. Financial institution 140 may comprise a credit card company, a bank, a credit union, etc.

Figure 2:
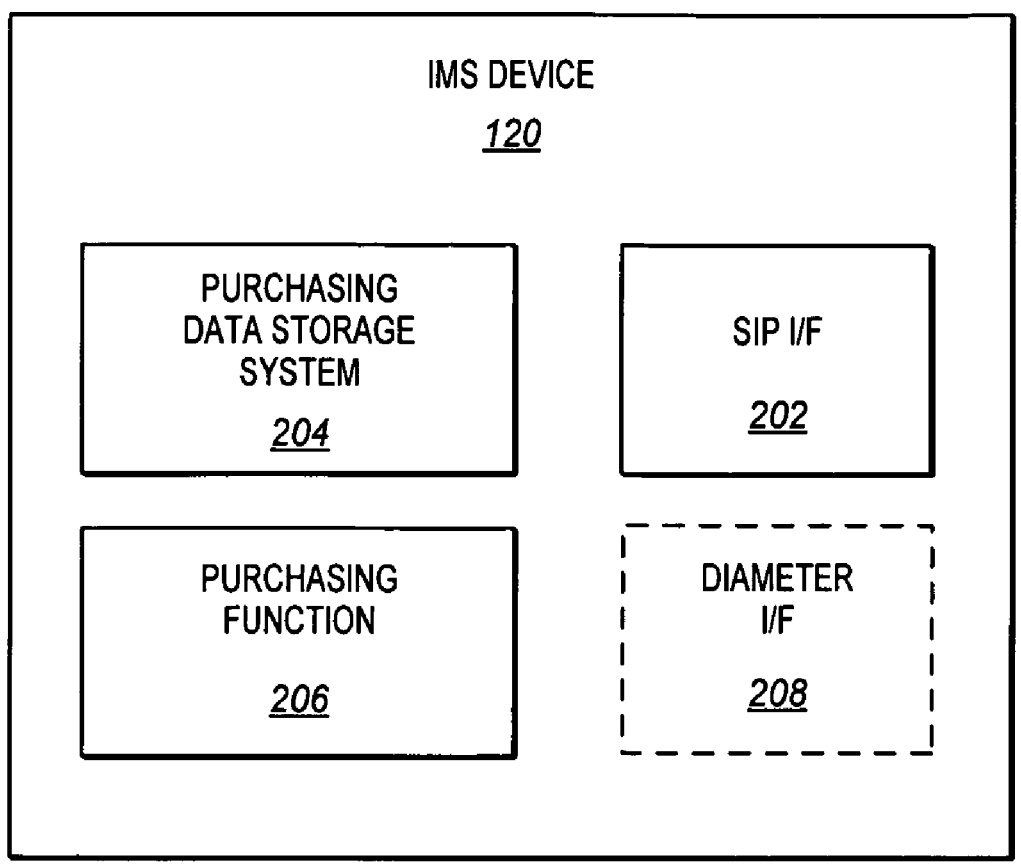
FIG. 2 is a block diagram illustrating an IMS device in an exemplary embodiment of the invention.

FIG. 2 is a block diagram illustrating IMS device 120 in an exemplary embodiment of the invention. IMS device 120 includes a SIP interface (I/F) 202, a purchasing data storage system 204, and a purchasing function 206. SIP interface 202 comprises any component or function operable to communicate with network elements in IMS network 110 (or other SIP-based networks) through Session Initiation Protocol (SIP). Purchasing data storage system 204 comprises any component or function operable to store data or other information used to purchase products, services, or other items from a merchant. Purchasing data may comprise credit card information, debit card information, bank card information, etc. Purchasing data storage system 204 may additionally store driver's license information, medical insurance information, frequent flyer information, or other information typically carried in a wallet or purse. Purchasing function 206 comprises any component or function operable to perform actions to conduct a financial transaction for the purchase of items from a merchant. For example, purchasing function 206 may be operable to communicate with a point-of-sale device 132 to conduct a financial transaction for the purchase of items. Those skilled in the art will appreciate that IMS device 120 may further include other systems, components, or functions other than those shown in FIG. 2, such as a keypad, a display, a Bluetooth interface, etc.

In one embodiment, IMS device 120 may optionally include a Diameter interface 208. Diameter interface 208 comprises any component or function operable to communicate with network elements in IMS network 110 through Diameter Protocol. Charging systems in IMS networks 110 presently use Diameter as the reference point for charging. For example, an Online Charging System (OCS) presently uses the Diameter Ro reference point. A CCF or CDF for offline charging presently uses the Diameter Rf reference point. IMS device 120 may include the Diameter interface 208 so that it may communicate with IMS charging system 112 (see FIG. 1) directly.

Figure 3:
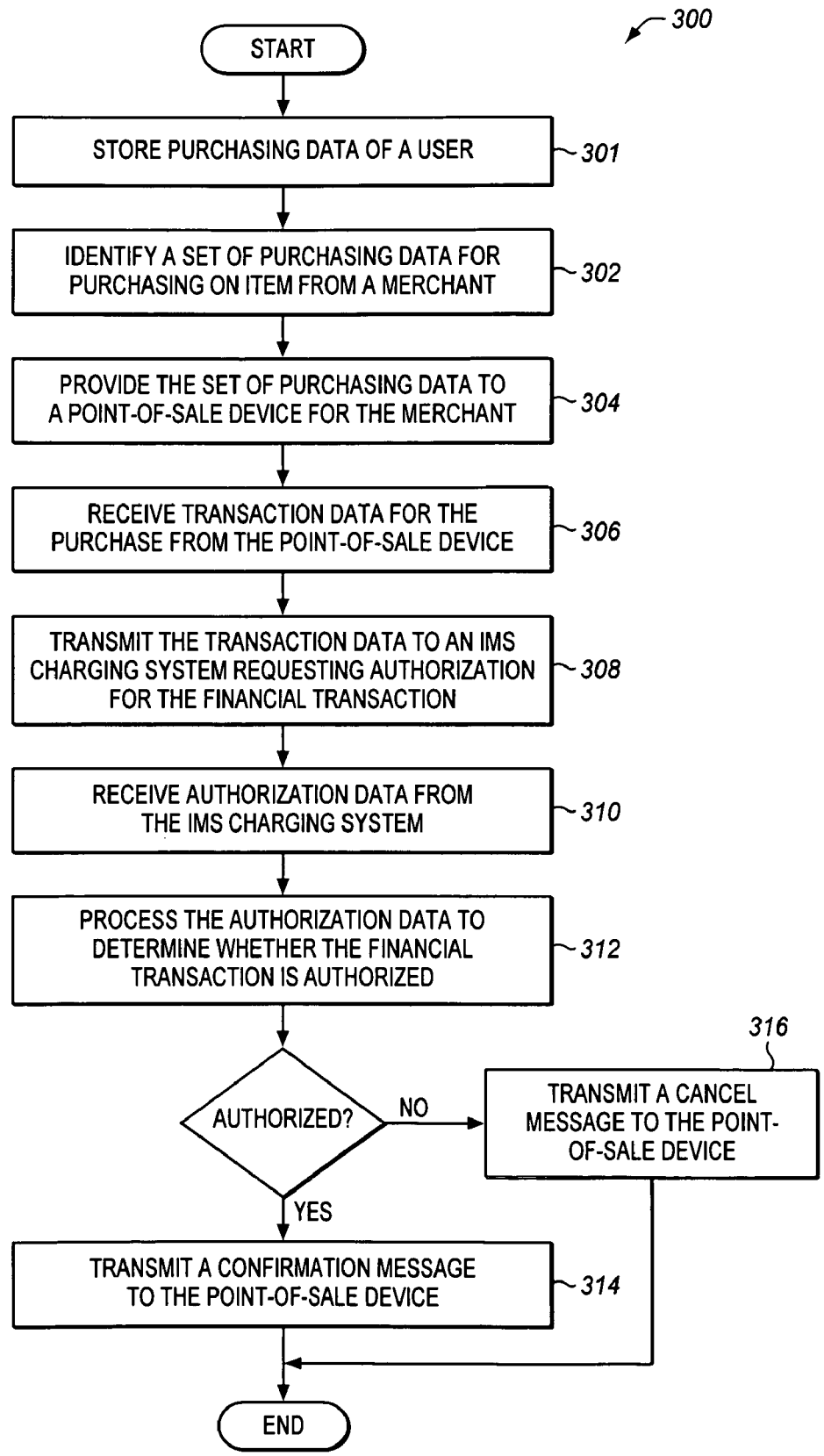
FIG. 3 is a flowchart illustrating a method of operating an IMS device to authorize financial transactions in an exemplary embodiment of the invention.

IMS device 120 is used in the following embodiments to conduct purchases of items from a merchant. Therefore, assume that the user of IMS device 120 wants to purchase an item from the merchant indicated in FIG. 1 by business 130. FIG. 3 illustrates how IMS network 110 is able to authorize the financial transaction.

FIG. 3 is a flowchart illustrating a method 300 of operating IMS device 120 to authorize financial transactions in an exemplary embodiment of the invention. The steps of method 300 will be described with reference to communication network 100 in FIG. 1 and IMS device 120 in FIG. 2. The steps of the flow chart in FIG. 3 are not all inclusive and may include other steps not shown.

According to the service offered by IMS network 110, the user of IMS device 120 enters or uploads purchasing data into the purchasing data storage system 204 of IMS device 120. For example, the user may enter a credit card number, an expiration date, a cardholder name, a card security code, etc., into IMS device 120. The user may also enter a debit card number, an expiration date, a cardholder name, card security code, a PIN, etc. The user may enter any other purchasing data into IMS device 120 as desired. The user may enter other information that it typically carried in a wallet or purse, such as driver's license information, medical insurance information, etc. Purchasing data storage system 204 then stores the purchasing data of the user in step 301. Purchasing data storage system 204 may store the purchasing data locally on IMS device 120, or may store the purchasing data on a network element in IMS network 110, such as application server 116.

In addition to entering the purchasing data, the user may actually scan an image of the credit card(s), debit card, bank card, driver's license, medical insurance card, etc, into IMS device 120. The images of the cards are stored in purchasing data storage system 204. The images may include the front and back of each card. The user of IMS device 120 may then access the images if needed to acquire further information, to show proof of identity (through a picture or signature), etc.

When it is time to pay for the item being purchased, IMS device 120 identifies a set of the purchasing data that has been selected for purchasing the item in step 302. To identify the purchasing data, purchasing function 206 may identify all or a subset of the purchasing data being stored in purchasing data storage system 204, and display a menu or list to the user of IMS device 120 indicating the available purchasing options. For instance, the menu may indicate two credit cards and one debit card available for the purchase. The user of IMS device 120 may then select one of the purchasing options (i.e., selecting a particular credit card). This selection by the user indicates the set of purchasing data that has been selected for the purchase, such as a Visa credit card.

In step 304, IMS device 120 provides the purchasing data to point-of-sale device 132 for use in purchasing the item. One assumption at this point is that point-of-sale device 132 has or will scan the item being purchased or otherwise start the transaction. IMS device 120 may provide the purchasing data to point-of-sale device 132 in a variety of ways. In one example, IMS device 120 may transmit the purchasing data to point-of-sale device 132 using a Bluetooth connection or some other short range wireless connection. In another example, IMS device 120 may display a bar code or some other marks that point-of-sale device 132 can scan or read. Point-of-sale device 132 then processes the purchasing data to initiate a financial transaction for the purchase of the item. As part of the financial transaction, point-of-sale device 132 generates transaction data, which comprises any information concerning the financial transaction. The transaction data may resemble an electronic receipt indicating the purchase amount, purchase date/time, purchase location, merchant identifier, etc.

During a typical financial transaction, point-of-sale device 132 uses ISO 8583 messages or another protocol to communicate with financial institution 140. Point-of-sale device 132 will first request authorization from financial institution 140 for the transaction. Financial institution 140 verifies the credit card number, the transaction type, and the amount with the issuer (card-issuing bank), and reserves that amount of the cardholder's credit limit for the merchant. If the transaction is authorized, then financial institution 140 issues an approval code to point-of-sale device 132. This completes the financial transaction.

Before point-of-sale device 132 transmits the authorization request to financial institution 140 or before completing the transaction, point-of-sale device 132 first waits for approval from IMS device 120 (through IMS network 110) according to the embodiments described herein. Point-of-sale device 132 transmits the transaction data to IMS device 120, which is received in IMS device 120 in step 306. IMS device 120 then transmits the transaction data to IMS charging system 112 in IMS network 110 requesting authorization for the financial transaction in step 308. IMS device 120 may transmit the transaction data to IMS charging system 112 in a variety of ways. In one example, IMS device 120 uses SIP interface 202 to transmit the transaction data. SIP interface 202 generates a SIP message, such as a SIP INVITE, inserts the transaction data in the SIP message, and transmits the SIP message to a network element in IMS network 110, such as an S-CSCF (not shown in FIG. 1). SIP interface 202 may insert the transaction data in a User-Data field of the SIP message. The S-CSCF (or its associated IMS gateway) will convert the SIP message into a Diameter charging request, and transmit the Diameter charging request to IMS charging system 112.

In another example, IMS device 120 includes Diameter interface 208. Diameter interface 208 thus generates a Diameter charging request, such as a Diameter Ro Credit Control Request (CCR) or a Diameter Rf Accounting Request (ACR), inserts the transaction data in the Diameter charging request, and transmits the Diameter charging request to IMS charging system 112 through a Diameter reference point. When inserting the transaction data in the Diameter charging request, existing AVPs in the Diameter charging response may be used for some of the transaction data. However, new AVPs may additionally be defined for the transaction data. For example, the Inter-Operator-Identifier AVP may be used for a merchant or store identifier. The Event-Timestamp AVP may be used for a timestamp of the financial transaction. The Event AVP may be used for the amount of the transaction. The Currency AVP may be used to indicate the currency for the financial transaction. New AVPs may be defined for other transaction data, such as for a bank identifier, an account identifier (i.e., checking, savings, etc), a credit card number, an expiration date, a security code, and merchant data, such as a merchant type, store location, etc.

Figure 4:
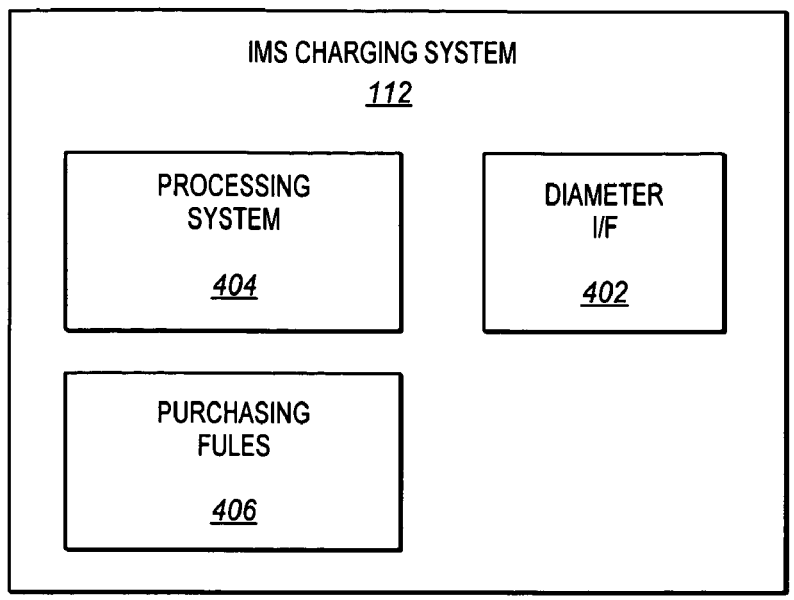
FIG. 4 is a block diagram illustrating an IMS charging system in an exemplary embodiment of the invention.

FIG. 4 is a block diagram illustrating IMS charging system 112 in an exemplary embodiment of the invention. IMS charging system 112 includes a Diameter interface (I/F) 402, a processing system 404, and purchasing rules 406. Diameter interface 402 comprises any component or function operable to communicate with network elements in IMS network 110 (or other Diameter-enabled devices) through a Diameter reference point. Processing system 404 comprises any processor or set of processors operable to execute instructions to operate as described below. Those skilled in the art will appreciate that IMS charging system 112 may further include other system, components, or functions other than those shown in FIG. 4, such as a rating function, an FTP interface, a TAP interface, etc.

Purchasing rules 406 comprise any predefined policies, rules, or criteria indicating the purchases allowed by the user of IMS device 120. For instance, purchasing rules 406 may indicate whether the transaction needs approval from a third party (i.e., a parent, boss, or other authority figure), a maximum purchase amount allowed, a maximum purchase amount allowed without authorization, a number of purchases allowed within a time period, one or more approved merchants from which the user is allowed to purchase items, one or more non-approved merchants from which the user is not allowed to purchase items, etc. IMS charging system 112 may be programmed with the purchasing rules 406, or may retrieve the purchasing rules 406 from another network element in IMS network 110, such as subscriber server 114. For example, subscriber server 114 may store the purchasing rules 406 for the user of IMS device 120 in a subscriber profile associated with the user. IMS charging system 112 may query subscriber server 114 for the purchasing rules 406, responsive to which subscriber server 114 processes the subscriber profile of the user for the purchasing rules 406, and responds to IMS charging system 112 with the purchasing rules 406.

Figure 5:
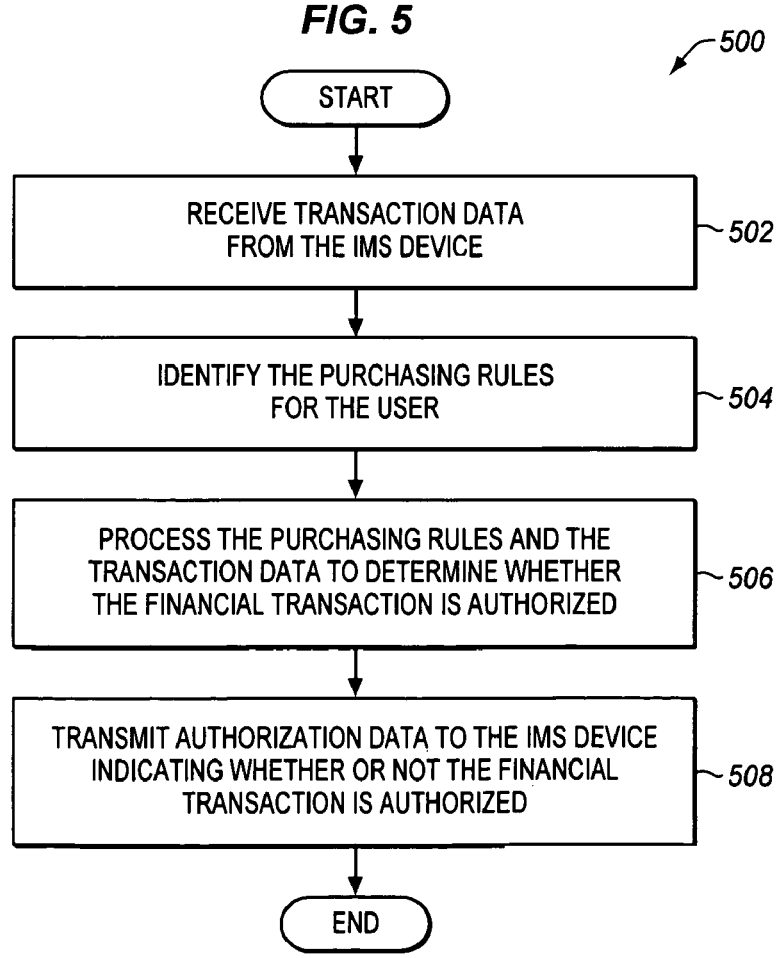
FIG. 5 is a flowchart illustrating a method of operating an IMS charging system to authorize financial transactions in an exemplary embodiment of the invention.

FIG. 5 is a flowchart illustrating a method 500 of operating IMS charging system 112 to authorize financial transactions in an exemplary embodiment of the invention. The steps of method 500 will be described with reference to communication network 100 in FIG. 1 and IMS charging system 112 in FIG. 4. The steps of the flow chart in FIG. 5 are not all inclusive and may include other steps not shown.

In step 502, processing system 404 receives the transaction data from IMS device 120 in the Diameter charging request through Diameter interface 402 for the attempted purchase of the item. Responsive to receiving the transaction data, processing system 404 identifies the purchasing rules 406 for the user of IMS device 120 in step 504. In step 506, processing system 404 processes the purchasing rules 406 and the transaction data to determine whether the financial transaction is authorized. To determine whether the financial transaction is authorized, IMS charging system 112 may query third party 150, financial institution 140, or some other individual or entity as to whether the transaction is authorized. For example, assume that the user of IMS device 120 is the child of third party 150 (i.e., a parent). The purchasing rules 406 for the user of IMS device 120 may indicate that any purchase must first be authorized by the parent of the user. Thus, IMS charging system 112 may transmit a text or multimedia message to third party 150, or otherwise communicate with third party 150 to determine whether the financial transaction is authorized. The communication to third party 150 may include details of the financial transaction, such as the item being purchased, the amount of the purchase, the merchant from which the item is being purchased, etc. Third party 150 then responds to IMS charging system 112 indicating that the transaction is authorized or not authorized.

IMS charging system 112 may alternatively query financial institution 140 much in the same way that point-of-sale device 132 would query financial institution 140. The query to financial institution 140 is to determine whether the financial transaction is allowed for this credit card, debit card, etc.

In step 508, processing system 404 transmits authorization data to IMS device 120 through Diameter interface 402. The authorization data indicates whether or not the financial transaction is authorized based on the purchasing rules 406 defined in IMS network 110. Processing system 404 may transmit the authorization data in a Diameter charging response. Processing system 404 thus generates a Diameter charging response, such as a Diameter Ro Credit Control Answer (CCA) or a Diameter Rf Accounting Answer (ACA), inserts the authorization data in the Diameter charging response, and transmits the Diameter charging response to IMS device 120 through a Diameter reference point. If IMS device 120 includes Diameter interface 208, then processing system 404 may transmit the Diameter charging response directly to IMS device 120. If IMS device 120 does not include Diameter interface 208, then processing system 404 may transmit the Diameter charging response to an S-CSCF which converts the Diameter charging response to a SIP message, and transmits the SIP message to IMS device 120. If existing AVPs in the Diameter charging response cannot be used for the authorization data, then a new AVP may be defined for the authorization data.

In method 300 of FIG. 3, IMS device 120 receives the authorization data in step 310. IMS device 120 processes the authorization data to determine whether the financial transaction is authorized in step 312. If the financial transaction is authorized, then IMS device 120 transmits a confirmation message to point-of-sale device 132 indicating that the financial transaction is authorized in step 314. If the financial transaction is not authorized, then IMS device 120 transmits a cancel message to point-of-sale device 132 indicating that the financial transaction is not authorized in step 316.

If a confirmation message is received, point-of-sale device 132 continues with the financial transaction to charge the credit card, debit card, etc, as indicated in the purchasing data. If a cancel message is received, point-of-sale device 132 cancels the financial transaction and the user of IMS device 120 is not allowed to purchase the item.

By predefining the purchasing rules 406 in IMS network 110, IMS network 110 can effectively control which financial transactions may occur through IMS device 120. For example, instead of a parent giving a child a credit card to use, the parent may load the credit card information (i.e., purchasing data) on IMS device 120. When the child attempts to purchase an item using IMS device 120, IMS network 110 will first process the purchasing rules 406 before allowing the financial transaction to take place. Thus, the parent can control what items the child can purchase, where the child can purchase items, and how much the child can spend before the financial transaction actually occurs.

After authorized transactions are completed, IMS device 120 may store records of the transactions for later viewing. FIG. 6 is a flowchart illustrating a method 600 of storing records of financial transactions in an exemplary embodiment of the invention. The steps of method 600 will be described with reference to communication network 100 in FIG. 1 and IMS device 120 in FIG. 2. The steps of the flow chart in FIG. 6 are not all inclusive and may include other steps not shown.

After a financial transaction has completed, point-of-sale device 132 generates a receipt of the transaction. In this embodiment, the receipt is in electronic form. Point-of-sale device 132 then transmits a copy of the electronic receipt to IMS device 120. IMS device 120 receives the electronic receipt of the financial transaction in step 602, and stores the receipt along with receipts of other financial transactions (if any) in a transaction record in step 604. If user of IMS device 120 or another party (i.e., a parent) wants to view the transaction record, then IMS device 120 accesses the transaction record to generate a report of the transactions in step 606. IMS device 120 then displays the transaction report in step 608.

EXAMPLE

The following illustrates an example of authorizing financial transactions through IMS network 110. FIG. 7 is a message diagram illustrating the messaging used to authorize a financial transaction in an exemplary embodiment of the invention. Assume for this embodiment that IMS device 120 is being used by a child of third party 150. Third party 150 has approved the storage of credit card information in IMS device 120 that may be used for certain purchases. Third party 150 has also pre-defined purchasing rules for the child, which indicates the types of purchases that are allowed.

Assume that the user (the child) of IMS device 120 wants to purchase an item from the merchant indicated in FIG. 1 by business 130. Point-of-sale device 132 scans the item being purchased by the user, and prepares to receive payment for the item from IMS device 120. IMS device 120 identifies a set of the purchasing data that has been selected for purchasing the item. In this example, IMS device 120 identifies the credit card information that the parents of the child loaded onto IMS device 120. IMS device 120 then provides the purchasing data to point-of-sale device 132 for use in purchasing the item. For example, IMS device 120 may use a Bluetooth connection with point-of-sale device 132 to transmit the purchasing data. Point-of-sale device 132 then processes the purchasing data, and generates transaction data for the financial transaction. Point-of-sale device 132 transmits the transaction data to IMS device 120.

IMS device 120, which has a Diameter interface in this example, generates a Diameter charging request, such as a Diameter Ro Credit Control Request (CCR) or a Diameter Rf Accounting Request (ACR), inserts the transaction data in the Diameter charging request, and transmits the Diameter charging request to IMS charging system 112 through a Diameter reference point. When inserting the transaction data in the Diameter charging request, existing AVPs in the Diameter charging response may be used for some of the transaction data, and new AVPs may additionally be defined for the transaction data.

IMS charging system 112 receives the transaction data from IMS device 120 in the Diameter charging request. Responsive to receiving the transaction data, IMS charging system 112 identifies the purchasing rules for the user of IMS device 120. Assume that the purchasing rules indicate that all purchases made by the user of IMS device 120 need to be approved by third party 150. The purchasing rules may also indicate the directory number or network address of third party 150, and a preferred mode of communication (such as text messages). IMS charging system 112 then transmits a text message to third party 150 (through an SMS-C) to determine whether the financial transaction is authorized. The text message to third party 150 may include details of the financial transaction, such as the item being purchased, the amount of the purchase, the merchant from which the item is being purchased, etc. Third party 150 then responds to IMS charging system 112 with a text message indicating that the transaction is authorized or not authorized.

IMS charging system 112 then generates a Diameter charging response, such as a Diameter Ro Credit Control Answer (CCA) or a Diameter Rf Accounting Answer (ACA), inserts authorization data in the Diameter charging response indicating whether or not the transaction is authorized, and transmits the Diameter charging response to IMS device 120 through a Diameter reference point. IMS device 120 receives the authorization data, and processes the authorization data to determine whether the financial transaction is authorized. If the financial transaction is authorized, then IMS device 120 transmits a confirmation message to point-of-sale device 132 indicating that the financial transaction is authorized. If the financial transaction is not authorized, then IMS device 120 transmits a cancel message to point-of-sale device 132 indicating that the financial transaction is not authorized.

If a confirmation message is received, point-of-sale device 132 continues with the financial transaction to charge the credit card of the user. If a cancel message is received, point-of-sale device 132 cancels the financial transaction and the user of IMS device 120 is not allowed to purchase the item.

The above embodiments have been tailored to IMS networks and IMS devices. The concepts described in the above embodiments may be extended to other types of communication networks, such as CDMA networks, GSM networks, etc. In other types of communication networks, a charging system in the network would operate substantially as described above for the IMS charging system to authorize financial transactions.

Although specific embodiments were described herein, the scope of the invention is not limited to those specific embodiments. The scope of the invention is defined by the following claims and any equivalents thereof.

We claim:

1. An Internet Protocol (IP) Multimedia Subsystem (IMS) charging system of an IMS network that is operated to authorize financial transactions initiated by an IMS device, the IMS charging system comprising:
   a function operated to provide charging for sessions by the IMS device in the IMS network;
   purchasing rules indicating purchases allowed by a user through the IMS device; and
   a processing system operated to receive transaction data from the IMS device in an IMS charging request, wherein the transaction data is generated by a point-of-sale device of a merchant for an attempted purchase of an item through the IMS device and is received in the IMS device from the point-of-sale device;
   the processing system further operated to identify the purchasing rules for the user of the IMS device, to process the purchasing rules and the transaction data to determine whether the financial transaction is authorized, and to transmit authorization data to the IMS device in an IMS charging response indicating whether or not the financial transaction is authorized.

2. The IMS charging system of claim 1 further comprising:
   a Diameter interface operated to receive the transaction data from the IMS device in a Diameter charging request.

3. The IMS charging system of claim 2 wherein:
   the Diameter interface is further operated to generate a Diameter charging response, to insert the authorization data in the Diameter charging response, and to transmit the Diameter charging response to the IMS device.

4. The IMS charging system of claim 1 wherein:
   the processing system is further operated to query a third party to determine whether the financial transaction is authorized based on the purchasing rules.

5. The IMS charging system of claim 1 wherein:
   the processing system is further operated to query a financial institution to determine whether the financial transaction is authorized based on the purchasing rules.

6. The IMS charging system of claim 1 wherein the processing system is implemented in a Charging Collector Function (CCF) used for offline charging in the IMS network.

7. The IMS charging system of claim 1 wherein the processing system is implemented in an Online Charging System (OCS) used for online charging in the IMS network.

8. A method for authorizing financial transactions in an Internet Protocol (IP) Multimedia Subsystem (IMS) network that are initiated by an IMS device, the method comprising:
   receiving transaction data from the IMS device in an IMS charging request, wherein the transaction data is generated by a point-of-sale device of a merchant for an attempted purchase of an item through the IMS device and is received in the IMS device from the point-of-sale device;
   identifying purchasing rules for a user of the IMS device, wherein the purchasing rules indicate purchases allowed by the user through the IMS device;

processing the purchasing rules and the transaction data to determine whether a financial transaction is authorized; and transmitting authorization data to the IMS device in an IMS charging response indicating whether or not the financial transaction is authorized.

9. The method of claim 8 further comprising:

receiving the transaction data from the IMS device in a Diameter charging request.

10. The method of claim 9 further comprising:

generating a Diameter charging response;

inserting the authorization data in the Diameter charging response; and transmitting the Diameter charging response to the IMS device.

11. The method of claim 8 further comprising:

querying a third party to determine whether the financial transaction is authorized based on the purchasing rules.

12. An Internet Protocol (IP) Multimedia Subsystem (IMS) device operated to authorize financial transactions, the IMS device comprising:

a purchasing data storage system operated to store purchasing data that is used to purchase items from a merchant; and a purchasing function operated to identify a set of the purchasing data that has been selected for purchasing an item from the merchant, to provide the purchasing data to a point-of-sale device for the merchant, to receive transaction data for an attempted purchase of the item from the merchant, and to transmit the transaction data to an IMS network requesting authorization for the financial transaction;

the purchasing function is further operated to receive authorization data from the IMS network, to process the authorization data to determine whether the financial transaction is authorized, to transmit a confirmation message to the point-of-sale device if the financial transaction is authorized, and to transmit a cancel message to the point-of-sale device if the financial transaction is not authorized.

13. The IMS device of claim 12 further comprising:

a Diameter interface operated to generate a Diameter charging request, to insert the transaction data in the Diameter charging request, and to transmit the Diameter charging request to the IMS network.

14. The IMS device of claim 13 wherein:

the Diameter interface is further operated to receive a Diameter charging response from the IMS network that includes the authorization data.

15. The IMS device of claim 12 wherein the purchasing data includes at least a credit card number, an expiration date of the credit card, a cardholder name, and a card security code.

16. The IMS device of claim 12 wherein the purchasing data includes at least a debit card number, an expiration date, a cardholder name, card security code, and a Personal Identification Number (PIN).

17. The IMS device of claim 12 wherein the purchasing data includes a scanned image of a credit card, debit card, or bank card.

18. The IMS device of claim 12 wherein:

the purchasing function is further operated to display a menu to a user indicating available purchasing options based on the purchasing data, and to receive a selection by the user indicating the set of purchasing data that has been selected for the purchase.

19. The IMS device of claim 12 wherein the purchasing function transmits the purchasing data to the point-of-sale device using a Bluetooth connection.

20. The IMS device of claim 12 wherein:

the purchasing function is further operated to receive an electronic receipt of the financial transaction from the point-of-sale device, and to store the electronic receipt in a transaction record;

in response to a request to view the transaction record, the purchasing function is further operated to access the transaction record to generate a report of the transactions, and to display the transaction report.

* * * * *